Aug. 25, 1936.    L. E. YOUNIE    2,052,066
CONNECTING LINK FOR CHAINS
Filed April 13, 1935
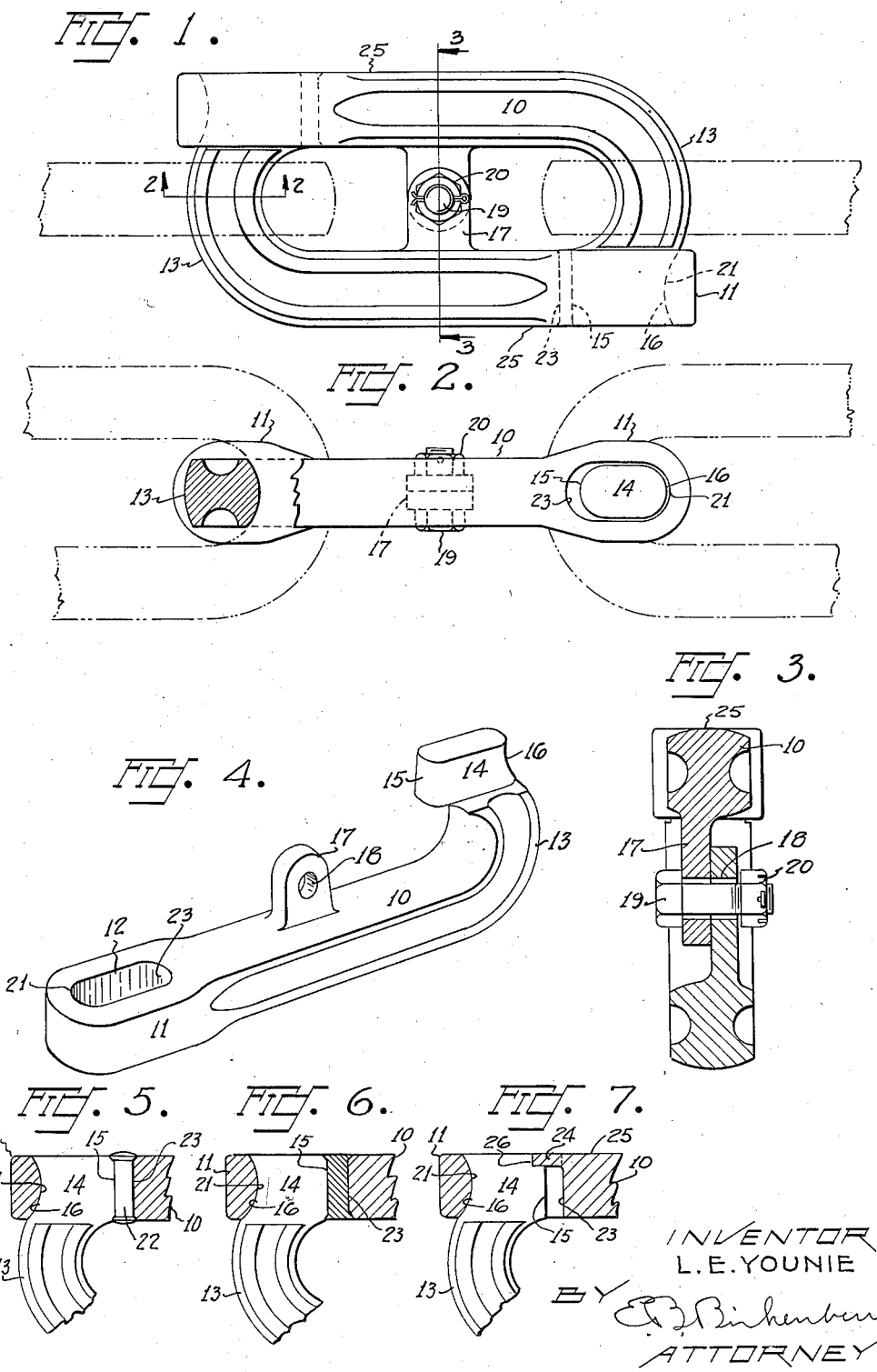
INVENTOR
L. E. YOUNIE
BY
ATTORNEY Patented Aug. 25, 1936

2,052,066

UNITED STATES PATENT OFFICE 2,052,066

CONNECTING LINK FOR CHAINS

Lewis E. Younie, Portland, Oreg., assignor to Electric Steel Foundry Company, Portland, Oreg.

Application April 13, 1935, Serial No. 16,230

3 Claims. (Cl. 59—85)

This invention relates generally to connecting links for chains, and particularly to a repair link therefor.

The main object of this invention is the provision of an exceedingly simple and efficient form of repair link which will take the place of the ordinary cold shut and which can be installed by an unskilled mechanic without the use of special tools.

The second object is the provision of a repair link which will provide the maximum amount of strength and which can be installed in a relatively short space of time.

The third object is to facilitate the repair of chains in the woods or at points remote from machine shops and without the aid of special tools.

These, and other objects, will become more apparent from the specification following as illustrated in the accompanying drawing, in which:

Fig. 1 is a side elevation of the preferred form of link.

Fig. 2 is an end elevation of my link showing a portion thereof broken away in section along the line 2—2 in Fig. 1.

Fig. 3 is a transverse section taken along the line 3—3 in Fig. 1.

Fig. 4 is a perspective view of one of the link parts.

Fig. 5 is a fragmentary section showing a modified form of the device using a steel pin as a retainer.

Fig. 6 is a fragmentary view of still another modified form of the device showing a soft metal plug used as a retainer.

Fig. 7 is a fragmentary view of another modified form of the device in which a riveting lug is cast on the link part.

Similar numbers of reference refer to similar parts throughout the several views.

Referring in detail to the drawing, there is shown in Fig. 4 one-half of a repair link, same consisting of a longitudinal side 10 whose end 11 is provided with an elongated slot 12 and whose end 13 is turned to form one end of the completed link. The end 13 terminates in an elongated shank 14, whose length is somewhat less than the length of the slot 12. The edge 15 of the shank 14 is preferably straight, while the edge 16 is preferably curved, as shown.

Intermediate the ends 11 and 13 is a lug 17 provided with a hole 18. An inspection of Fig. 1 will show that two of the parts, shown in Fig. 4, will form a complete link, as shown in Fig. 1, and these can be slipped together without the use of any tools, and when the holes 18 are brought into register, a bolt 19 or a rivet may be passed therethrough and secured in place either by keying the nut 20 or by upsetting the end of the bolt.

It will be noted that the bolt 19 is loose within the holes 18 so that no stresses are transferred to the bolt. As soon as a stress is imposed upon the assembled link parts, the rounded edges 16 engage the corresponding rounded edges 21 of the slot 12, thereby preventing any lateral spreading or separation of the link parts.

In the form of the device shown in Fig. 5 instead of relying upon the bolt 19 to prevent a relative sliding movement of the link parts, there is employed a steel pin 22, which is driven into the clearance space between the edge 15 of the shank 14 and the end 23 of the slot 12.

In the form of the device shown in Fig. 6, a soft metal, such as, lead, zinc or babbitt, fills the clearance space between the edges 15 and 23.

In the form of the device shown in Fig. 7, a lug 24 is cast on the outer side 25 and is bent downwardly into the notch 26 formed in the shank 14.

Obviously, the retainers shown in Figs. 5, 6 and 7 may be used with or without the bolt 19.

I claim:

1. A connecting link for chains consisting of two separate parts, each of which consists of a longitudinal section, one end of which is slotted and the other end of which is turned backwardly upon itself to form one end of a link, said backwardly turned portion having a shank projecting therefrom which is normal to the longitudinal section of the part, the outermost edge of said shank being concavely curved and the outermost end of the slot of the adjacent part being convexly curved to conform to the curvature of said shank edge, said longitudinal sections having intermediate perforated lugs formed thereon, the perforations of which are in register when the two parts are assembled, and a bolt passing through the holes of both lugs to prevent the separation of the parts.

2. A connecting link for chains consisting of a pair of elongated side members, each of said side members having an elongated slot formed in one end thereof, the outermost end of each slot being convexly curved, each of said side members having a curved end opposite its slotted end and having a shank formed on the tip of said curved end, said shanks having their outermost ends concavely curved, which shank is in parallelism with the slot at the opposite end of said member and having substantially the same width as said slot but of less length to permit a limited lonigtudinal movement between the shank and slot when two like members are assembled, each of said longitudinal members having a lug formed on the inner side thereof projecting in the same direction as does its shank, each of said lugs having an opening formed therein, said openings coming into register when two parts are assembled in a manner that the shank of each part shall occupy the slot of the other part and a bolt passed through the openings in said lugs to prevent the separation of the assembled parts.

3. A connecting link for chains consisting of a pair of duplicate members, each of which has an elongated side one end of which is curved to form a link end, said curved end having a shank formed thereon with its axis in the longitudinal plane of the member, the end of each member opposite the curved end having an aperture therein parallel to and conforming with the shape of its shank, each elongated portion having an inwardly projecting perforated lug between its curved end and aperture on one side of the longitudinal plane passing through said shank and aperture, the perforations in said lugs registering when the shank of each member occupies the aperture of the other member and means within both perforations adapted to hold the members against separation in a transverse direction.

LEWIS E. YOUNIE.